United States Patent
Koh et al.

(10) Patent No.: US 9,495,391 B1
(45) Date of Patent: Nov. 15, 2016

(54) SYSTEM AND METHOD FOR INITIATING SOCIAL INTERACTIONS BETWEEN USERS IN A NETWORK ENVIRONMENT

(71) Applicant: MATCH.COM, L.L.C., Dallas, TX (US)

(72) Inventors: David F. Koh, Brooklyn, NY (US); Tom R. Quisel, New York, NY (US); Daniel D. Andres, New York, NY (US); Matthew J. Miller, Edison, NJ (US); Michael Bryan Oltman, Brooklyn, NY (US); Morley Zhi, Brooklyn, NY (US); Sidney San Martin, New York, NY (US)

(73) Assignee: MATCH.COM, L.L.C., Dallas, TX (US)

( * ) Notice: Subject to any disclaimer, the term of this patent is extended or adjusted under 35 U.S.C. 154(b) by 177 days.

(21) Appl. No.: 13/913,819

(22) Filed: Jun. 10, 2013

(51) Int. Cl.
*G06F 17/30* (2006.01)

(52) U.S. Cl.
CPC .............. *G06F 17/30283* (2013.01)

(58) Field of Classification Search
CPC .................. G06F 17/3062; G06Q 30/08
USPC ............ 707/705, 706, 754, 14.53, 758
See application file for complete search history.

(56) References Cited

U.S. PATENT DOCUMENTS

| | | | | |
|---|---|---|---|---|
| 6,085,166 A | * | 7/2000 | Beckhardt | G06Q 10/109 705/7.18 |
| 6,101,480 A | * | 8/2000 | Conmy | G06Q 10/109 705/7.18 |
| 8,189,781 B1 | | 5/2012 | Hartman | |
| 8,615,520 B2 | * | 12/2013 | Fallah | G06Q 30/08 705/14.53 |
| 2001/0014866 A1 | * | 8/2001 | Conmy | G06F 17/211 705/7.19 |
| 2001/0014867 A1 | * | 8/2001 | Conmy | G06F 17/211 705/7.18 |
| 2002/0131565 A1 | * | 9/2002 | Scheuring | G06Q 10/109 379/88.19 |
| 2004/0078256 A1 | * | 4/2004 | Glitho et al. | 705/8 |
| 2004/0255304 A1 | | 12/2004 | Ishikawa | |
| 2005/0165740 A1 | * | 7/2005 | Kerr et al. | 707/3 |
| 2005/0261950 A1 | * | 11/2005 | McCandliss | 705/9 |
| 2007/0260989 A1 | * | 11/2007 | Vakil et al. | 715/748 |
| 2008/0040142 A1 | * | 2/2008 | Liu | 705/1 |
| 2009/0322597 A1 | | 12/2009 | Medina Herrero et al. | |

(Continued)

OTHER PUBLICATIONS

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).

(Continued)

*Primary Examiner* — Baoquoc N To
(74) *Attorney, Agent, or Firm* — Patent Capital Group

(57) ABSTRACT

A method is provided in one example embodiment and includes receiving a request from a first user to browse a pool of date requests, where each of the date requests is associated with a potential match in a computer-implemented matching system and includes at least one of a calendar date and a location. The method further includes presenting to the first user information regarding the potential match associated with one of the date requests, and sending a date invitation to the potential match associated with the particular one of the date requests.

15 Claims, 18 Drawing Sheets

(56) References Cited

U.S. PATENT DOCUMENTS

| | | |
|---|---|---|
| 2010/0246576 A1 | 9/2010 | Bustamente |
| 2010/0283827 A1 | 11/2010 | Bustamente |
| 2010/0285856 A1 | 11/2010 | Thomas |
| 2010/0287286 A1 | 11/2010 | Bustamente |
| 2011/0078129 A1 | 3/2011 | Chunilal |
| 2011/0167059 A1* | 7/2011 | Fallah ............... G06Q 30/08 707/723 |
| 2011/0313647 A1 | 12/2011 | Koebler et al. |
| 2012/0323909 A1 | 12/2012 | Behforooz et al. |
| 2013/0151326 A1 | 6/2013 | Engstrom et al. |
| 2014/0032434 A1* | 1/2014 | Kumar ..................... 705/319 |
| 2014/0108522 A1 | 4/2014 | Gersh |
| 2014/0164151 A1 | 6/2014 | Hockley |

OTHER PUBLICATIONS

Zoosk Customer Support, "How Do I Video Chat?" available online at <URL https://zoosk.zendesk.com/entries/20513017-how-do-i-video-chat> Oct. 7, 2011 (3 pages).

Non-Final Office Action issued for U.S. Appl. No. 13/913,739 mailed Mar. 23, 2015, 16 pages.

Non-Final Office Action issued for U.S. Appl. No. 13/913,776 mailed Mar. 24, 2015, 10 pages.

Final Office Action issued for U.S. Appl. No. 13/913,739 mailed Jul. 17, 2015, 23 pages.

Final Office Action issued for U.S. Appl. No. 13/913,776 mailed Jul. 31, 2015, 15 pages.

Non-Final Office Action issued for U.S. Appl. No. 13/913,739 mailed Nov. 19, 2015, 24 pages.

\* cited by examiner

FIG. 2E match.com

[SUBSCRIBE]  Home  Search▽  Matches▽  Connections▽  Messages▽  Profile●  Account▽

Welcome CaptureTest                                          📱mobile  ➕invite friends Find Love. Guaranteed. GO >>    No one can find you until you finish your profile. Complete yours now >> looking4lovemom sparked your interest - that's great! Check out his/her profile, but first, take a minute to fill out yours so others like looking4lovemom can find you.

looking4lovemom
38-year old
Dallas TX, US,
View Profile

UPLOAD PHOTOS

ABOUT ME
BASICS ‹
APPEARANCE
BACKGROUND/VALUES
LIFESTYLE
INTERESTS
GET TO KNOW ME
ABOUT MY DATE
IN MY OWN WORDS
----
PHOTOS

BASICS  1|2

SYNAPSE INTELLIGENT MATCHING   Your answers are the first inputs into our intelligent matching engine, so make sure to answer as accurately as possible.

Welcome to our community! What brings you here today?
[No answer ▼]

What is your relationship status?
[Never Married ▼]

What is your gender?
[Man ▼]

Who are you looking for?
[Women ▼] between ages [18 ▼] and
[35 ▼]

Where should we search?
◉ Search by radius (US, Canada and UK only)
   living within [50] miles
   of ZIP/Postal code [66046]
   in [United States ▼]

○ Search by region (country, state/province or city)

☐ I only want to see matches who have photos.

[SAVE & CONTINUE >>]

FIG. 2F match.com  SUBSCRIBE    Home  Search ▽  Matches ▽  Connections ▽  Messages ▽  Profile ● Account ▽

Welcome lisdfkldsasifndk                                                            📱 mobile  ✚ invite friends
Find Love. Guaranteed.  GO >>    No one can find you until you finish your profile. Complete yours now >>

ABOUT ME
ABOUT MY DATE
APPEARANCE ◁
BACKGROUND/VALUES
LIFESTYLE
IN MY OWN WORDS
―――――
PHOTOS

HER APPEARANCE

⚛ SYNAPSE INTELLIGENT MATCHING  Now tell us what you're looking for so we can start selecting compatible matches for you.

How tall should she be?
From [3 ▼] ft. [0 ▼] in. To [8 ▼] ft. [11 ▼] in.
☑ No Preference

Body type:
☐ Slender        ☐ About average
☐ Athletic and toned   ☐ Heavyset
☐ A few extra pounds   ☐ Stocky
☐ Big and beautiful    ☐ Curvy
☐ full-figured

Eye Color:
☐ Black    ☐ Blue     ☑ No Preference
☐ Grey     ☐ Green    ☐ Brown
                      ☐ Hazel

Hair Color:
☐ Auburn / Red   ☐ Black         ☑ No Preference
☐ Light brown    ☐ Dark Brown
☐ Blonde         ☐ Salt and pepper
☐ Silver         ☐ Dark blonde
☐ Grey           ☐ Platinum
☐ Bald

UPLOAD PHOTOS  76%

SAVE & CONTINUE >>

FIG. 2G match.com  [SUBSCRIBE]  Home  Search ▾  Matches ▾  Connections ▾  Messages ▾  Profile ⦿  Account ▾

Welcome lisdfkidsasifndk  📱mobile  ✚Invite friends

Find Love. Guaranteed. GO >>  No one can find you until you finish your profile. Complete yours now >>

ABOUT ME
ABOUT MY DATE
APPEARANCE
BACKGROUND/VALUES >
LIFESTYLE
IN MY OWN WORDS
----
PHOTOS

HER BACKGROUND/VALUES  Be honest about your deal breakers, and careful not to be too limiting.

⚛ SYNAPSE INTELLIGENT MATCHING

76%

UPLOAD PHOTOS

Ethnicities:
☑ No Preference
☐ Asian           ☐ Black / African descent
☐ East Indian     ☐ Latino / Hispanic
☐ Middle Eastern  ☐ Native American
☐ Pacific Islander ☐ White / Caucasian
☐ Other

Religion:
☑ No Preference
☐ Agnostic          ☐ Atheist
☐ Buddhist / Taoist ☐ Christian / Catholic
☐ Christian / LDS   ☐ Christian / Protestant
☐ Hindu             ☐ Jewish
☐ Muslim / Islam    ☐ Spiritual but not religious
☐ Other             ☐ Christian / Other

Education level:
☑ No Preference
☐ High School        ☐ Some College
☐ Associates degree  ☐ Bachelors degree
☐ Graduate degree    ☐ PhD / Post Doctoral

Languages spoken:
☑ English  ☐ French  ☐ No Preference  ☐ Spanish
more >>

[SAVE & CONTINUE >>]

FIG. 2H

match.com          close window

LadyDi520
Active within 24 hours    New
Basics
  "Looking for my Knight in Shining Armor"
  I am a:           32 yr old woman
  located in:       Dallas, Texas, United States
  looking for:      Dating: 32 to 45-year old man within 25 miles of Dallas metroplex, Dallas, Texas, United States
  relationships:    Currently separated
  my ethnicity:     White / Caucasian
  body type:        Slender
  height:           5' 4" (162.6 cms)
  sense of humor:   Clever: Nothing's better than a quick-witted comeback, Friendly: I'll laugh at anything
  sign:             Cancer
About me and who I'd like to meet
  I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!
Appearance
  height:           5' 4" (162.6 cms)
  eyes:             Green
  hair:             Auburn / Red
  body type:        Slender
  body art:         Belly button ring
  best feature:     Chest
Interests
for fun:
  I love to have a good time at whatever I am doing. I love to laugh I love to smile and I am looking for that someone that can make that happen, it hasn't for a LONG time.

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I used to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer |
| pets: | |
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2I

| | |
|---|---|
| languages: | English |
| politics: | Conservative |
| About My Date | |
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun<br>Boot scootin' across gritty floorboards, the band playing what we'll soon remember as "our song" |
| Photos | |

SYSTEM AND METHOD FOR INITIATING SOCIAL INTERACTIONS BETWEEN USERS IN A NETWORK ENVIRONMENT

RELATED APPLICATIONS

This application is related to U.S. patent application Ser. No. 13/913,739, filed Jun. 10, 2013, entitled "SYSTEM AND METHOD FOR INITIATING SOCIAL INTERACTIONS BETWEEN USERS IN A NETWORK ENVIRONMENT" and U.S. patent application Ser. No. 13/913,776, filed Jun. 10, 2013, entitled "SYSTEM AND METHOD FOR RATING SOCIAL INTERACTIONS BETWEEN USERS IN A NETWORK ENVIRONMENT", the disclosures of which are considered part of and are incorporated by reference in the disclosure of this application.

TECHNICAL FIELD

This disclosure relates in general to the field of communications and, more particularly, to a system and a method for initiating social interactions between users in a network environment.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users in a particular online dating community. The information each end user provides about him or herself may be viewed by other end users in the online community in determining whether to interact with that end user. In certain cases, the actual dating platform can participate in matching activities. This interventionist involvement can often spur or provoke new relationships being formed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-J are simplified screen shots of an example protocol for participating in an on-line dating service in accordance with one embodiment of the present disclosure;

DETAILED DESCRIPTION OF EXAMPLE EMBODIMENTS

Overview

Figure 1:
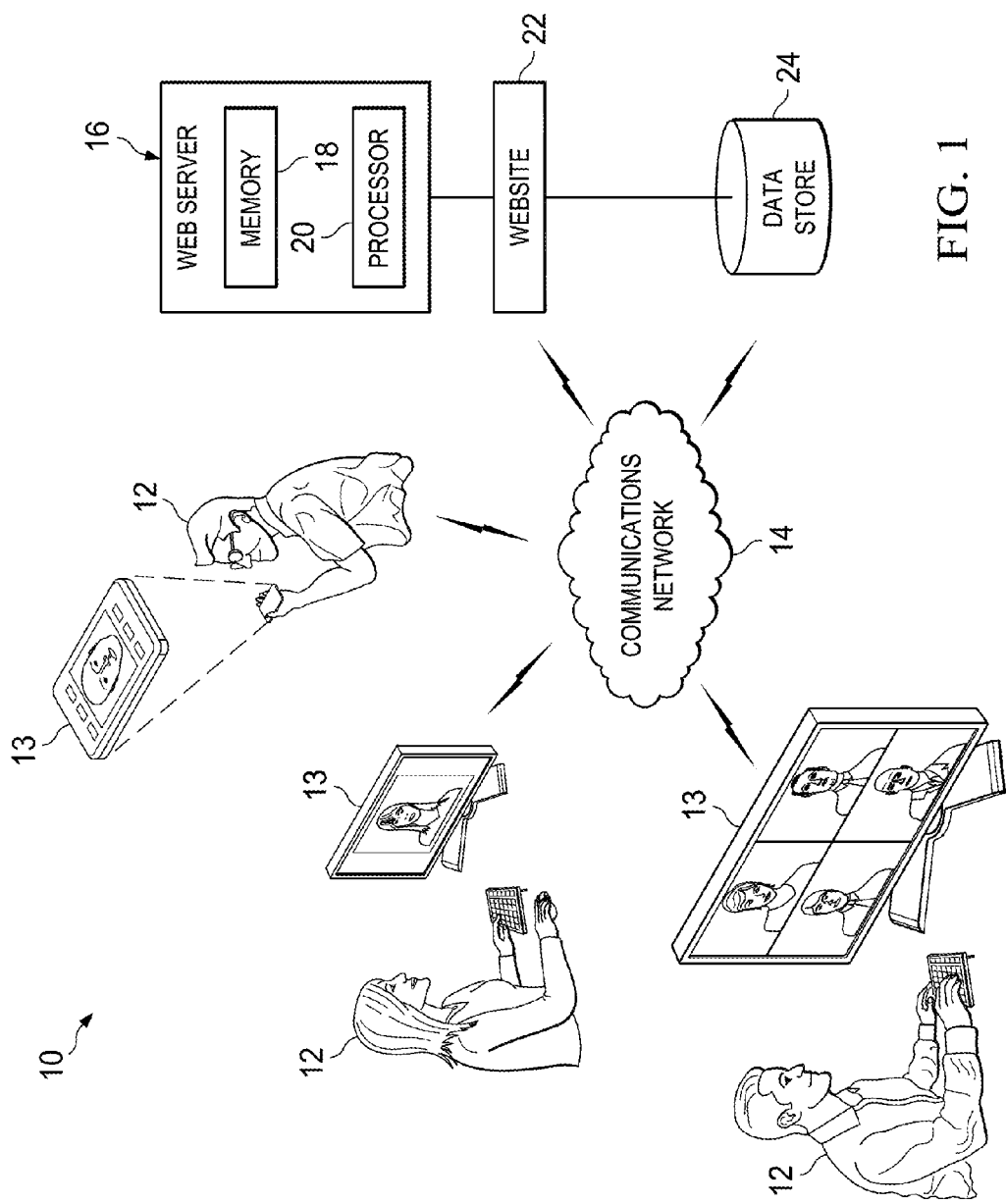
FIG. 1 is a network diagram showing an operating environment of the present disclosure in accordance with one embodiment of the present disclosure.

A method is provided in one example embodiment and includes receiving a request from a first user to browse (e.g., evaluate, consider, review, etc.) a pool of date requests. The term "pool" includes any type of plurality, any type of subset, any type of grouping, etc. Each of the date requests may be associated with a potential match in a computer-implemented matching system. The actual "date requests" can include any type of sign-up data, electronic invitation requests, enrollment, user clicking activities, menu selection, e-mail requests, instant messaging requests, voice selections, automatic/default requests (in which the user is not necessarily/directly involved in making the decision), or any other suitable request framework.

One or more of the date requests can include a calendar date and a location selected by the associated user. The calendar day can include any type of timeslot, day of the week, approximate timeframe, etc. Additionally, the "location" can include a designated entertainment destination (e.g., a cooking class, a movie theater, a coffee shop, a restaurant, etc.), an address, a public area (e.g., a public park, a library, etc.). The method also includes presenting (in any suitable format) to the first user information regarding the potential match associated with one of the date requests and sending a date invitation to the potential match associated with the particular one of the date requests. Note that that the term "sending" can refer to any type of communication in which a date request is sent. This could involve a direct communication (between the user and another user, between a first user and a website, etc., where any communication technology can be employed), an indirect communication (e.g., in which a website performs this communication), any type of intermediary being used, any type of proxying scenario, any type of involvement from the computer-implemented matching system, etc.

In one embodiment, the request further comprises filtering criteria and the presenting further comprises identifying at least of the one date requests that meets one or more of the filtering criteria and presenting to the first user information regarding the potential match associated with the identified at least one of the date requests. In one aspect, the information comprises at least one of a name, an age, a sexual orientation, and a picture of the potential match associated with the particular one of the date requests. The picture of the potential match may be partially obfuscated.

The method may further comprise, if the potential match associated with the identified date request declines the date invitation, creating a new date request for the first user, where the new date request is identical to the particular one of the date requests and adding the new date request to the date request pool. The date invitation may include information identifying (e.g., providing at least one identifying characteristic) the requester. This could include, for example, and a picture of the requester, where the picture may be partially obfuscated. The term "obfuscated" is meant to encompass any type of scenario in which at least some information is being withheld, hidden, or otherwise limited.

Example Embodiments

FIG. 1 is a simplified block diagram of a system 10 for facilitating an online dating scenario in a network environment. In other embodiments in which communications or matching is valuable, system 10 can be leveraged to identify and to evaluate suitable candidates in other areas (e.g., hiring/employment, recruiting, real estate, general person searches, etc.). FIG. 1 includes multiple end users 12 and endpoints 13, a communications network 14, a web server 16 comprising memory 18 and a at least one processor 20, a website 22, and a data store 24. Data store 24 may be any type of mechanism for storing data, including but not limited to one or more files, databases, memory devices, mass storage devices, data centers, etc. System 10, users 12 interact with web server 16 via endpoints 13, each of which comprises an appropriate user interface for interacting with web server 16 via website 22 for facilitating functions and features described herein. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Ancillary components to such a comprehensive process may involve pre-date profiles, post-date follow-ups, and a myriad of other significant features, some of which are outlined in greater detail below.

End users 12 may include a variety of types of end users, such as clients, customers, prospective customers, or entities wishing to participate in an online dating scenario and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another.

End users 12 may access the aforementioned data via endpoints 13, which may be inclusive of devices used to initiate a communication. Note that the broad term "user" encompasses any type of node or user device, or any type of endpoint discussed herein. Additionally, the term "user" can further include any type of profile to be used in the system discussed herein. Hence, the term "user" can include (but is not limited to) elements such as a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22 and has access to transmit and receive user or presence data (e.g., user profile data, user and/or user endpoint data, user contact data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate actions associated with finding a potential match candidate. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to one or more end users 12. In a generic sense, web server 16 can implement a computer-implemented matching system that provides a framework for suitable matching activities. For example, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein. Any combination of these elements can be reflective of a computer-implemented matching system.

In one particular embodiment, web server 16, via interaction with database 24 and/or in conjunction with website 22, is engaged in facilitating interaction(s) between parties interested in seeking a romantic partner (i.e., online dating). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from member end users. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
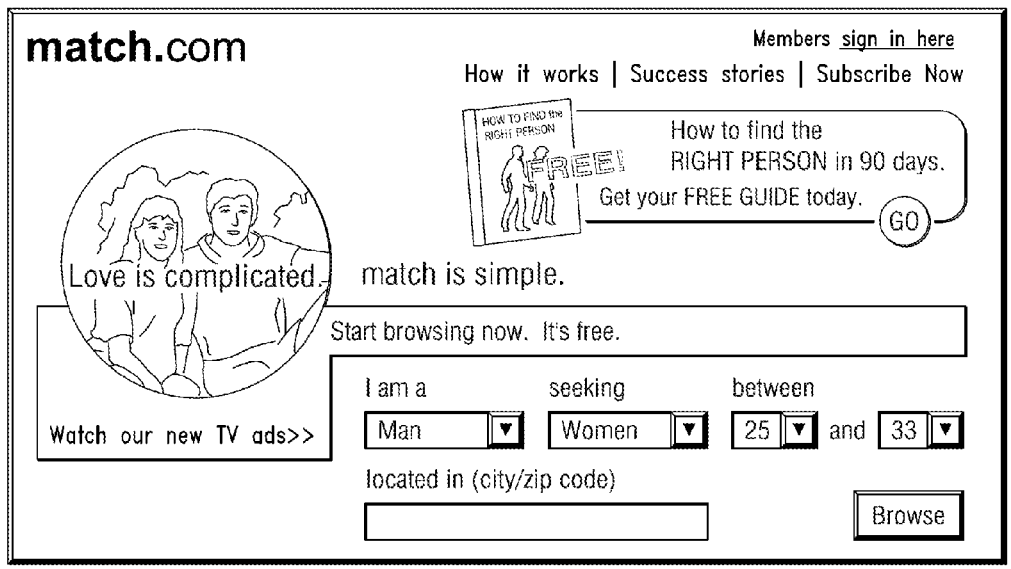
Figure 2B:
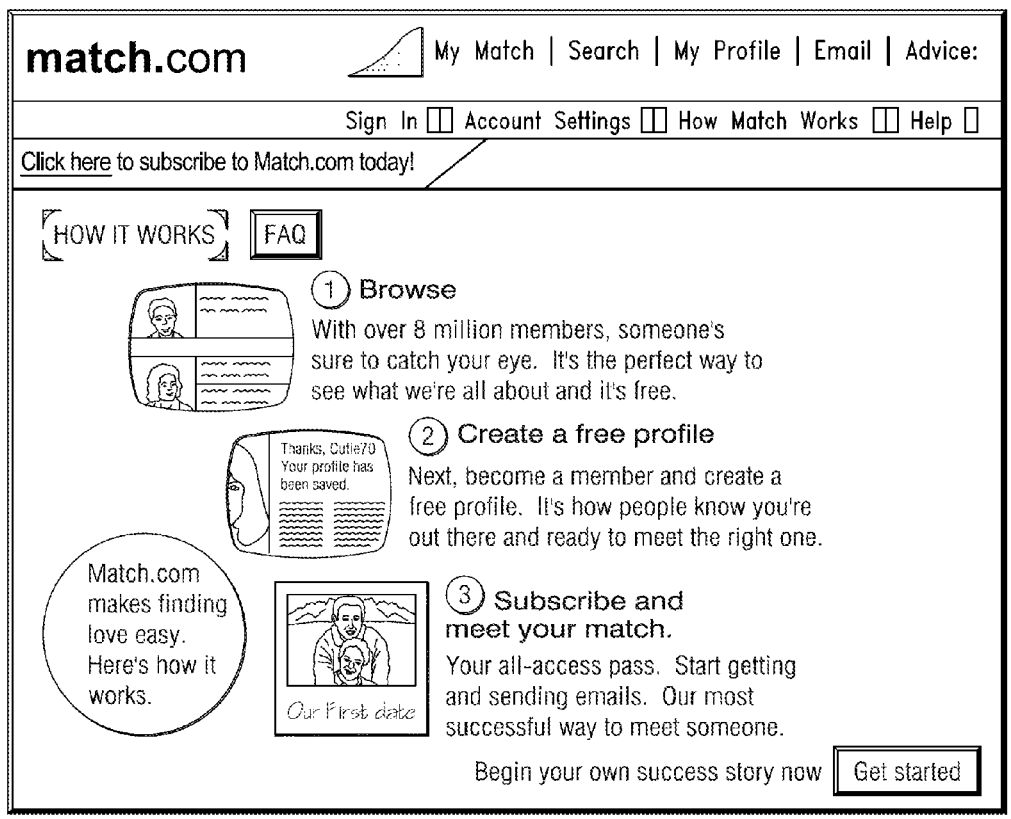

FIG. 2A is an example screen shot of a home page from which an interested end user may begin his/her journey. In the illustrated example, the home page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the home page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view pictures of members along with summaries of the members' profiles. After browsing the website, the end user may decide to create a free profile. Once the end user browses the website and creates a profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male named "Tom" who is interested in finding a female match.

Figure 2C:
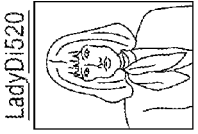
Figure 2D:

FIG. 2C is an example screen shot of a number of profiles that may be viewed by Tom during the browsing phase described above. In the context of this shot, Tom may be simply browsing. Assuming Tom has decided he would like to know more about one of the members whose profile is presented in FIG. 2C, he may click on the picture associated with the selected profile. For example, assuming Tom has decided he would like more information about "LadyDi520", clicking on her picture results in his being directed to a web page as shown in FIG. 2D, where he is solicited to sign up for the online dating subscription such that he can effectively contact his candidate selection. It will be noted that the information solicited using the page shown in FIG. 2C may be used in selecting matches for Tom. The information may also be displayed on Tom's profile or summary thereof presented to other users to assist those users in determining whether they are interested in interacting with him.

FIGS. 2E-2G illustrate various screen shots comprising a user information collection process in accordance with one embodiment. Using the web pages illustrated in FIGS. 2E-2G, system 10 collects a variety of information from an end user, including, but not limited to, basic information about the end user (FIG. 2E), as well as information about the type person the end user would be interested in dating, including information about a potential date's physical appearance (FIG. 2F) and background and values (FIG. 2G). It will be recognized that the information collected using the web pages illustrated in FIGS. 2E-2G is illustrative only and that any type/amount of information may be solicited in the illustrated manner.

FIGS. 2H-2J are example screen shots of the full profile of LadyDi520, the picture Tom selected while browsing. In illustrated profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include a photo, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

Figures 3, 4:
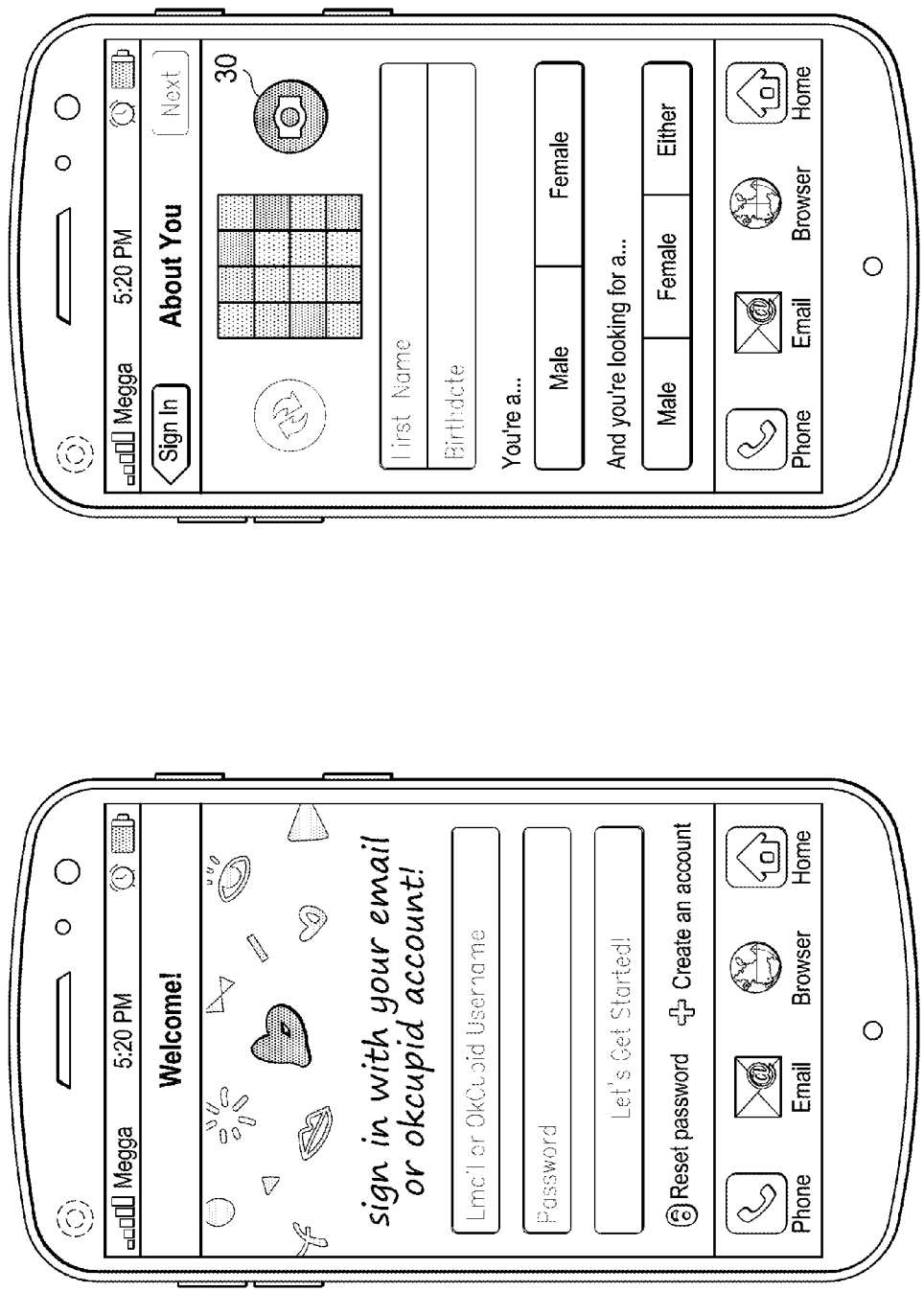
FIGS. 3-10 are simplified screen shots of an example protocol for registering with and submitting a date request using a Blind Date Request ("BDR") feature of an on-line dating service, such as illustrated in FIGS. 1-2J, in accordance with one embodiment of the present disclosure.

In one embodiment, the system 10 may include a feature referred to herein as a Blind Date Request ("BDR") feature. The BDR feature may be accessed in any number of known manners, including clicking on a link, icon, or other element provided in a GUI displayed on a web page. Alternatively, the BDR feature may be implemented as a standalone feature. In certain cases, the BDR feature can be provided as an application ("app") that is readily downloaded and/or purchased from an app provider (e.g., iTunes™, Match-.com™, etc.). Once a user accesses the BDR feature, he or she may be required to create a special BDR account or to sign in using an existing account, as illustrated in FIG. 3. To create a new BDR account, as illustrated in FIG. 4, various information is solicited from the user, including, for example, the user's first name, birth date, gender, and the gender the user is seeking to date. The user is also prompted to click on a camera icon 30 to take a photo of himself or herself or to select a photo from photos that have already been uploaded to the system 10 or are stored on the endpoint equipment employed by the user.

Figure 6:
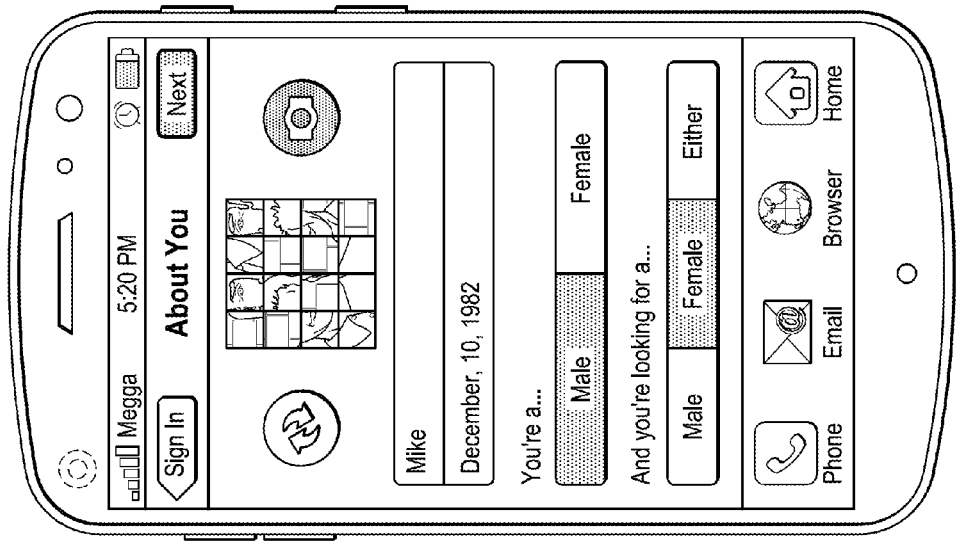
Figure 5:
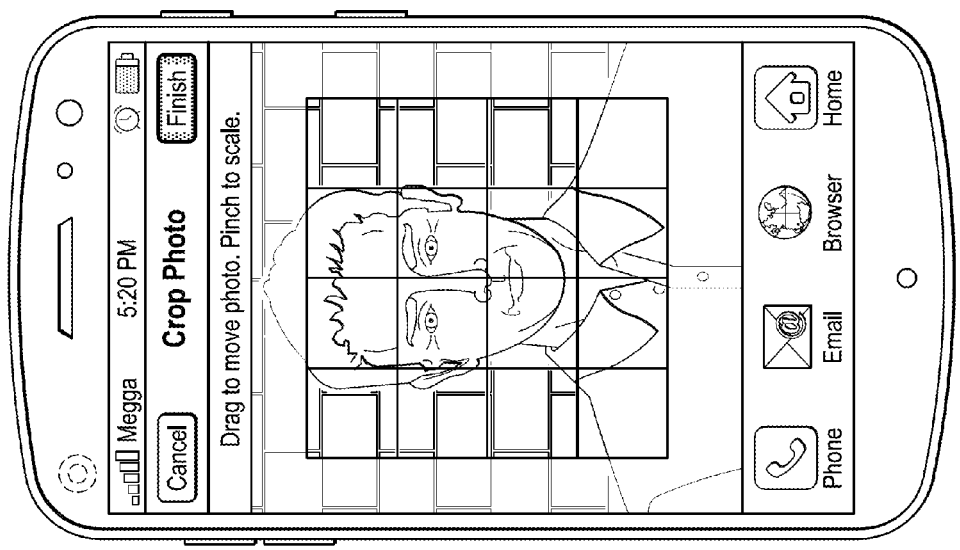
Figure 8:
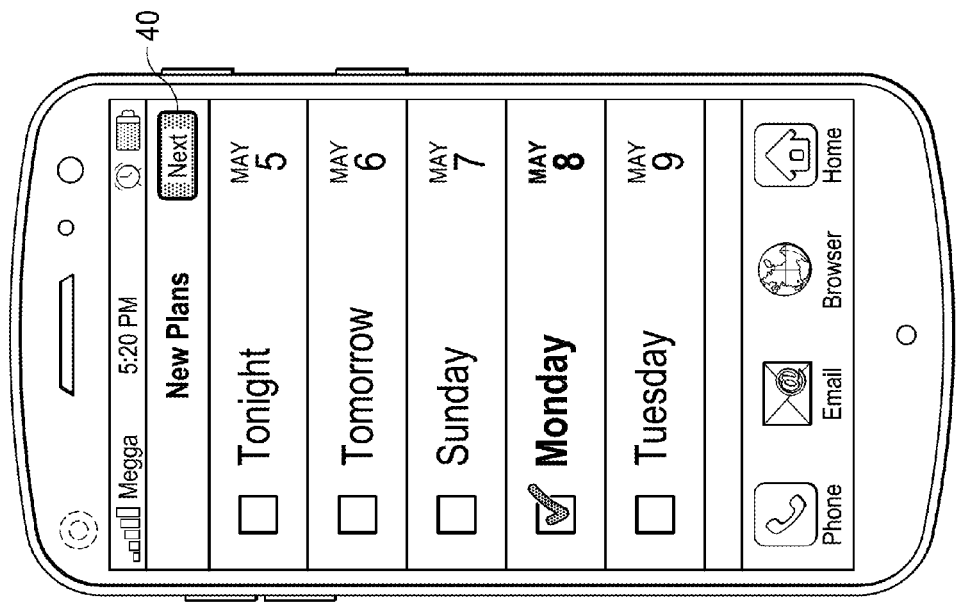
Figure 7:
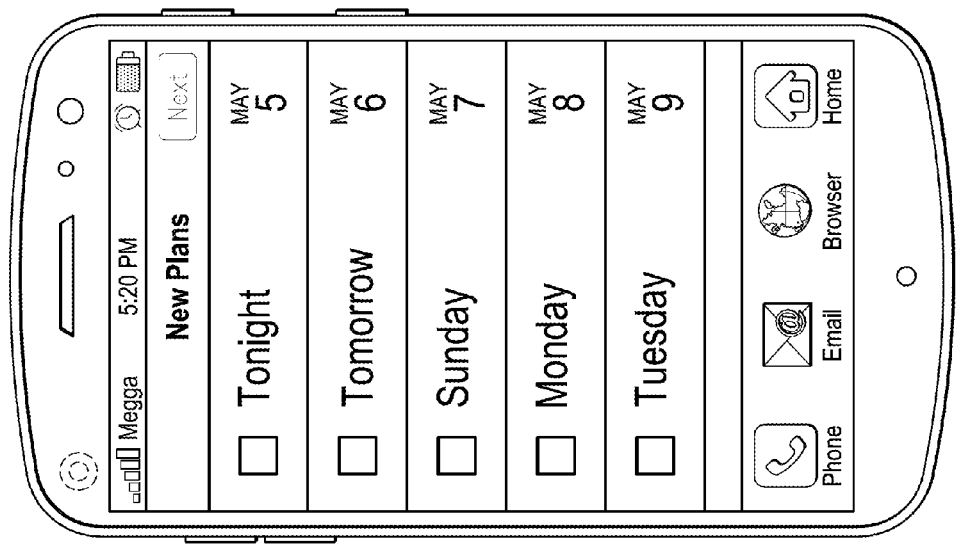
Figure 10:
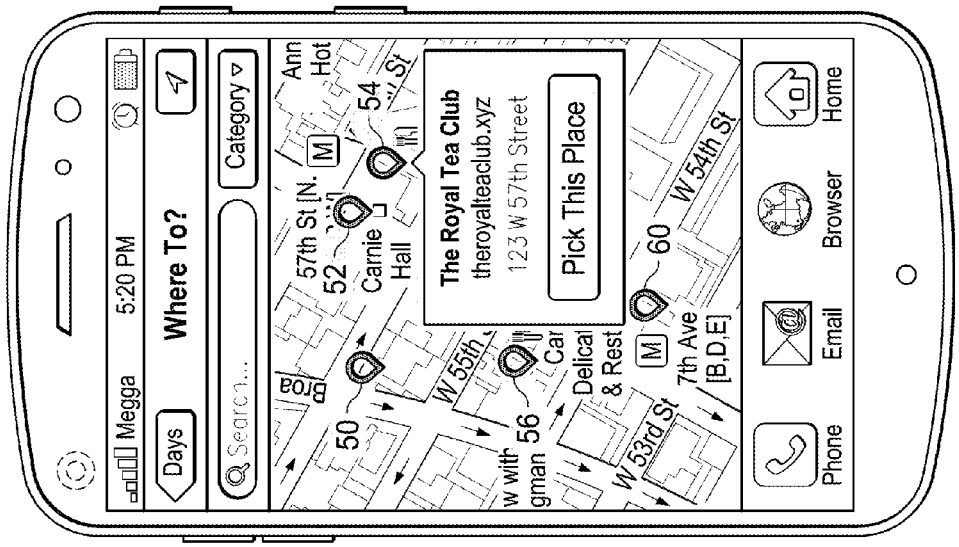
Figure 9:
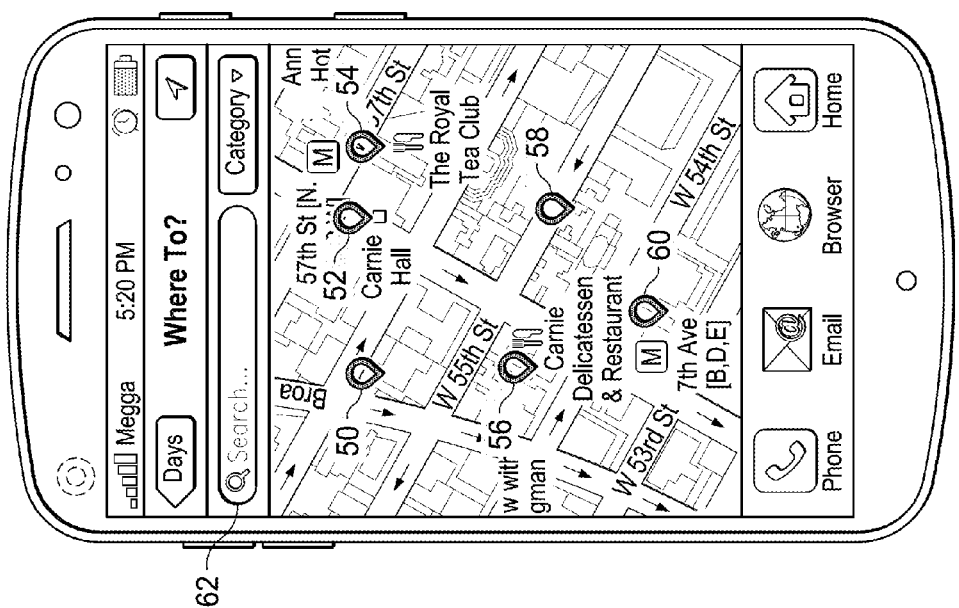

Once a photo of the user has been taken/selected, the user may edit the photo, as illustrated in FIG. 5. After all of the user's information, including the photo, has been submitted, as illustrated in FIG. 6, the user is prompted to begin developing a date request. The first step in the date request process is to select a calendar date on which the user would like to conduct the date. This is illustrated in FIG. 7, in which several calendar dates are presented to the user. The user selects a calendar date by clicking the box corresponding to the desired calendar date and then clicks a next button 40. It will be assumed for the sake of example that the user selects Monday, May 8 (FIG. 8). Next, the user is prompted to select a location for the date. In one embodiment, as illustrated in FIG. 9, the user is presented with a map with a variety of locations indicated by markers, such as markers 50-60. The locations indicated on the map may preferably be conveniently located proximate the user's current location or some other location that has been designated by the user. Alternatively, the user may search for a particular location (e.g., by entering a search query in a field 62, or may select a category, via a drop down menu 64, to filter displayed locations by type or some other criteria). Hovering the mouse cursor or other pointer over one of the markers 50-60 results in display of additional information regarding the location designated by the marker, as illustrated in FIG. 10. In the example illustrated in FIG. 10, "The Royal Tea Club" is designated by the marker 54. A web address and a physical address for The Royal Tea Club are displayed for the user's convenience. Selecting "Pick This Place" results in the displayed location being selected as the location for the date.

Figure 11:
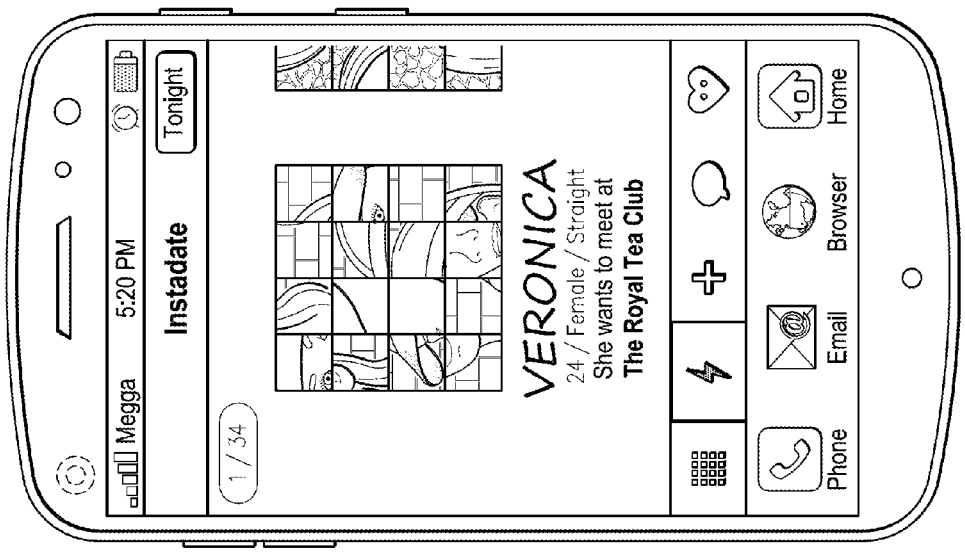

Date requests submitted in the manner described above are maintained in a pool of date requests, as described in detail in related U.S. patent application Ser. No. 13/913,739, which is incorporated by reference hereinabove. In addition to searching the pool of date requests to find matching date requests to be presented to the user (as described in the aforementioned related application), an instant date feature of one embodiment of the system 10, described in detail hereinbelow, may be employed by a user to browse (in a limited manner) the date request pool, thereby enabling the user to select for him- or herself a date request that appeals to the user. It will be recognized that screens similar to those illustrated above with respect to submitting a date request (e.g., FIGS. 7-10) may be presented to a user to enable the user to enter filter criteria, such that only date requests that meet the user's criteria are presented for his/her review as potentially being of interest to (or a match for) the user. For example, the user may specify one or more of a gender, an age, a geographic location, or a particular type of meeting place (e.g., a coffee shop or a book store) to filter the results from the date request pool presented to the user. FIG. 11 illustrates display of an example date request presented to the user using the instant date feature after the user has entered filter information.

As shown in FIG. 11, the information provided to the user for the user who submitted the selected date request (the "potential match") is the same information solicited from the user as described with reference to and illustrated in FIG. 4, including the match's first name, age, gender, and sexual orientation; however, the match's picture has been partially obfuscated in any appropriate manner (e.g., by "puzzlization") to disguise the actual appearance of the user. Other techniques can involve distorting the image through pixel manipulation, removing certain blocks of image data, contorting the image (e.g., much like a funhouse mirror), etc. In this manner, the user may ascertain a general idea of the match's features (eye color, hair color, etc.), but the puzzlization will advantageously impede the ability of the user to base his or her selection solely on the physical appearance of the match. Although not shown, the user may "scroll" to pages displaying the other matches using one of any number of known navigation techniques. It will be further noted from FIG. 11 that, in one embodiment, the displayed date request includes only the location of the date (for example, "Veronica" wants to meet at "The Royal Tea Club"); however, there is no calendar date specified. In other embodiments, a calendar date, as well as a time, may be specified in the date request.

Figure 12:
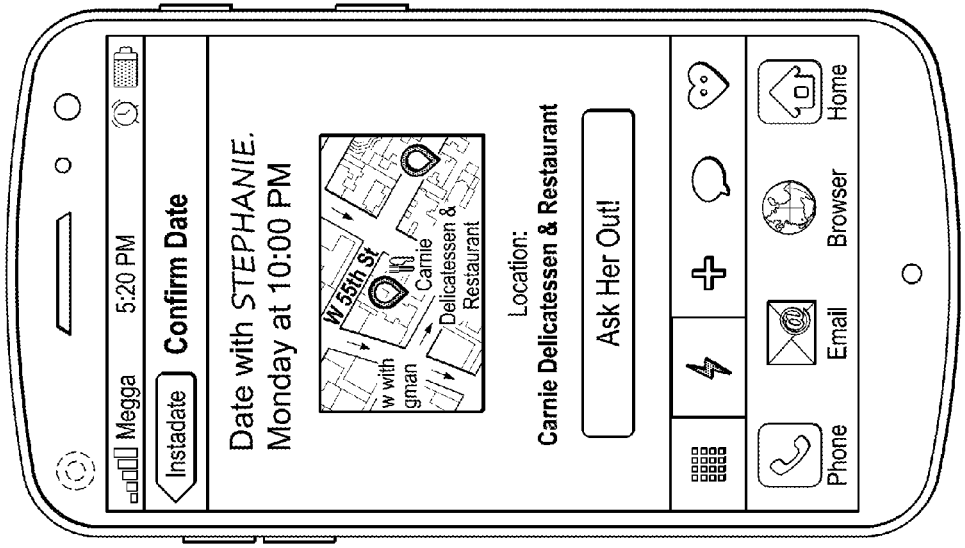
FIGS. 11-13 are simplified screen shots of an example protocol for scheduling a blind date using an instant date feature in combination with the BDR feature of an on-line dating service, such as illustrated in FIGS. 1-2J, in accordance with one embodiment of the present disclosure.
Figure 13:
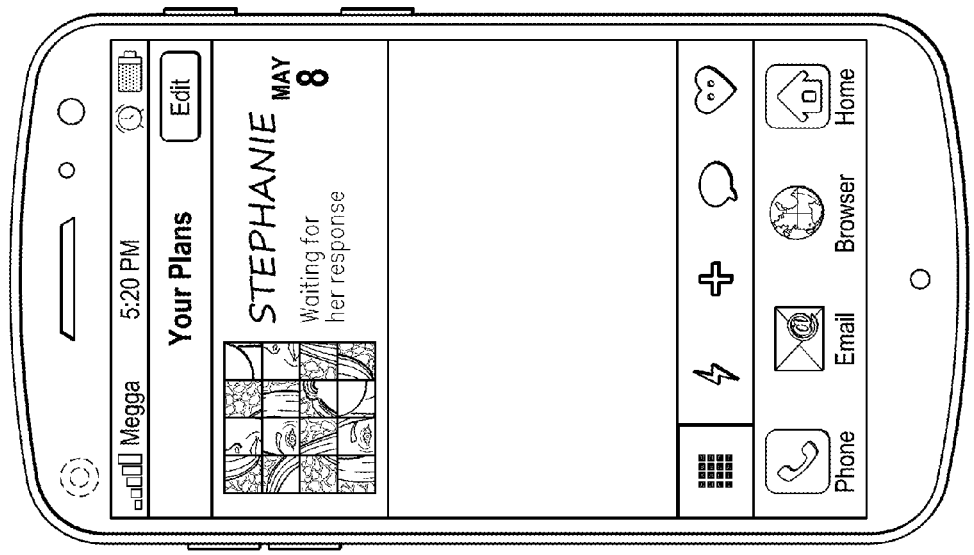

Referring now to FIG. 12, once the user finds a date request that interests him or her, the user may a calendar date and time (e.g., Monday at 10:00 PM), if these items are not already specified, and subsequently confirm the selection of the date by clicking an "Ask [Him/Her] Out" button 70. Upon confirmation of the date in this manner, an invitation is sent to the potential match who submitted the date request (in the illustrated example, "Stephanie"). The date invitation will provide Stephanie with the same information about the user that was provided to the user about her, including the user's name, age, gender, sexual orientation, and a puzzlized version of the picture the user submitted as illustrated in FIG. 4. Stephanie can use this information to determine whether to accept or decline the received date invitation. The user may access a "Your Plans" page to determine the status of the date invitation. For example, as illustrated in FIG. 13, until Stephanie has accepted or declined the date invitation, the user's plans will reflect that the user is waiting for Stephanie's response. Assuming Stephanie accepts the date invitation, the user's Your Plans page will reflect that the date has been confirmed.

Figure 14:
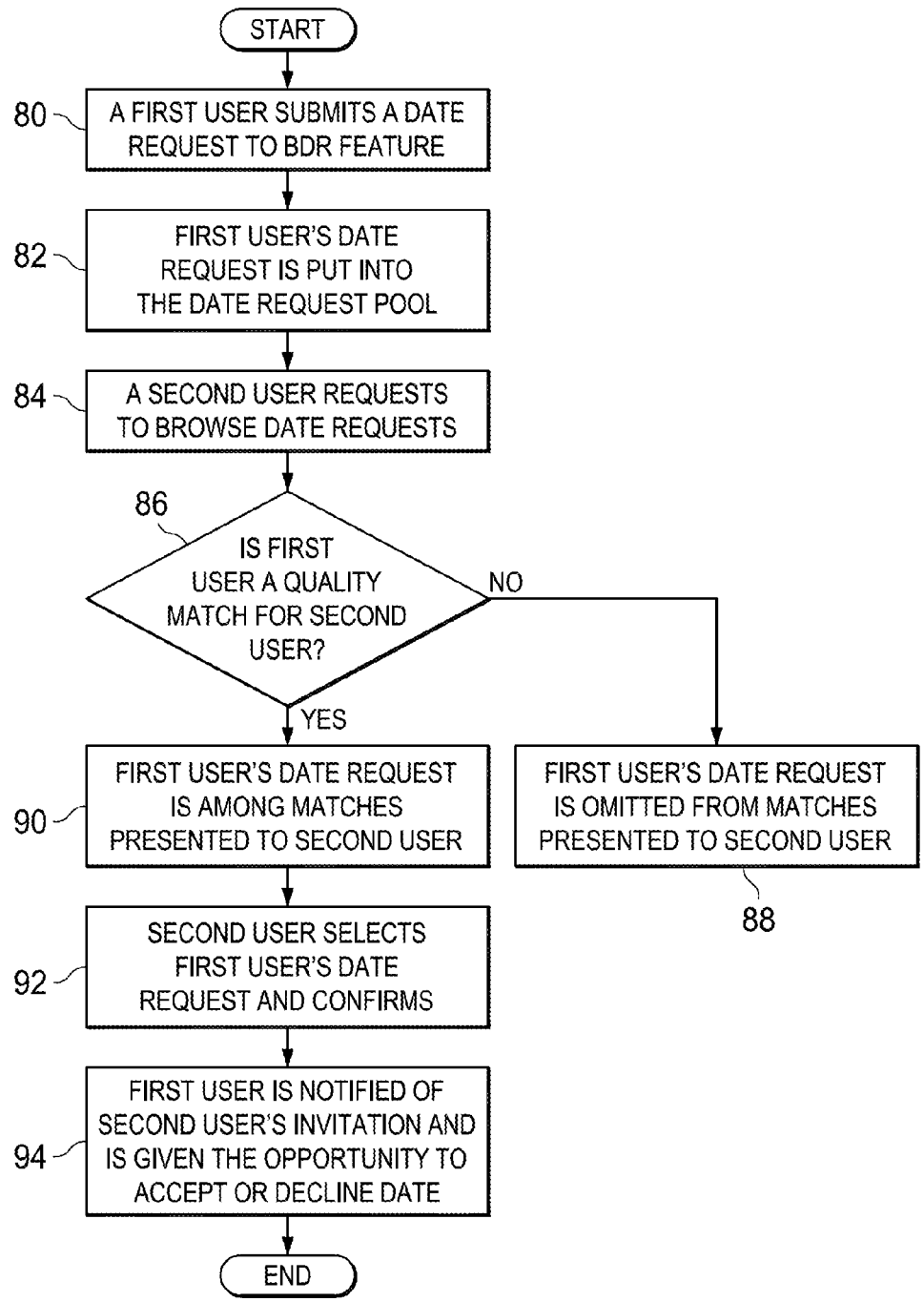
FIGS. 14 and 15 are flow diagrams illustrating logic implemented by an instant date feature implemented in connection with the BDR feature of one embodiment of the present disclosure.

FIG. 14 is a flowchart illustrating logic implemented by an instant date feature in accordance with one embodiment in an example implementation. In one embodiment, the logic for implementing the instant date feature (potentially to be embodied in software) could be provided in web server 16. Referring to FIG. 14, in step 80, a first user submits a date request to the BDR feature. As noted above, the date request may include a calendar date on which the user would like to schedule a date. It will be recognized that this step may be performed in any number of manners. For example, the user may be presented with a list of calendar dates proximate the current calendar date from which to select one, as illustrated in FIGS. 7 and 8. Alternatively, the user may be prompted to enter a calendar date in a designated format or may be presented with a calendar from which to select a date by clicking on the corresponding day. The same or similar technique(s) may be used to designate a time. Also in step 80, the user selects or enters a location for the date. As with the calendar date selection process, the location selection process may be performed in any number of manners, such as in the manner illustrated in FIGS. 9 and 10 or by enabling the user to enter a search query and select a location from the search results or to enter a filter and select from a list of locations corresponding to the filter.

In step 82, the first user's date request is added to the date request pool. The date request pool comprises a pool of as yet unfulfilled date requests submitted by other users in the manner described above. In step 84, a second user accesses the instant date feature to browse date requests in the date request pool. As noted above, the second user's browse request may include a variety of criteria with which date requests will be filtered. In step 86, a determination is made whether the first user's date request is a match for the second user as per the second user's filter criteria. If not, execution proceeds to step 88, in which the first user's date request is omitted from date request matches presented to the second user in response to the second user's browse request and remains in the pool. If a positive determination is made in step 86, execution proceeds to step 90, in which the first user's date request is included among the matches presented to the second user in response to the second user's browse request. In step 92, it will be assumed for the sake of example that the second user selects the first user's date request from among the presented date requests and confirms the selected date request, resulting in an invitation being sent to the first user. In step 94, the first user is notified of the second user's invitation and is given the opportunity to accept or decline the invitation.

It will be recognized that the first user's date request may result in invitations from multiple users via the instant date feature. From those multiple invitations, the first user will have to select a single invitation to accept. Each of the other users who have sent the first user invitations in response to the first user's date request has, by selecting the first user's date request, indicated his/her availability at the date/time designated in the first user's date request, as well as his/her interest in meeting at the location designated in that request. In one embodiment, the instant date feature leverages on that fact by creating a date request for each of the rejected users and adding those date requests back to the pool. Logic for implementing this aspect of the instant date feature is illustrated in FIG. 15.

Figure 15:
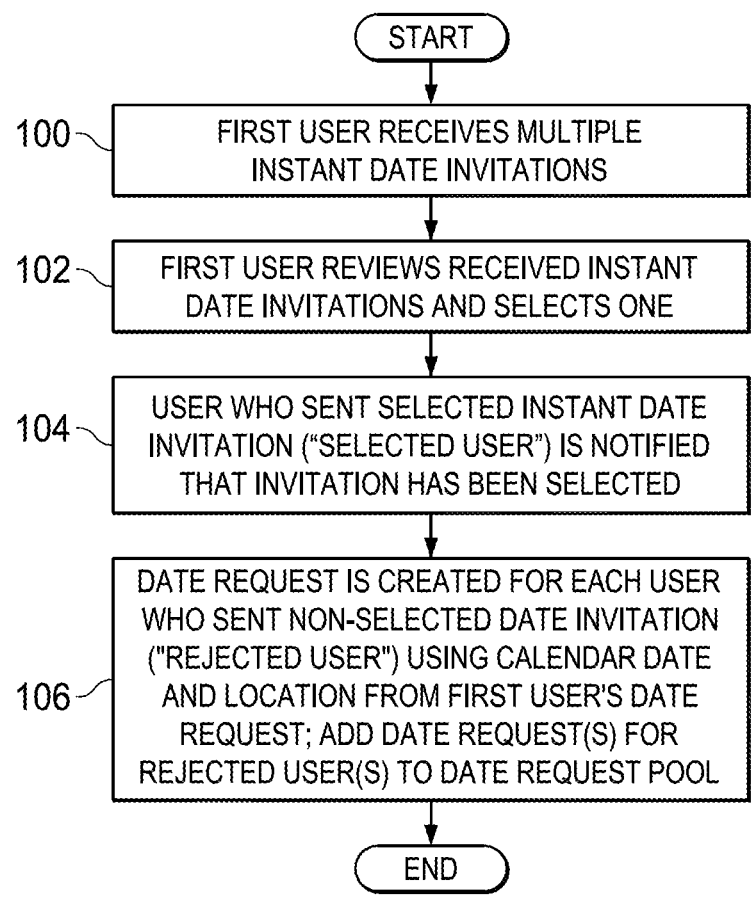

Referring to FIG. 15, execution begins in step 100 in which the first user receives multiple instant date invitations (comprising responses to the first user's date request). In step 102, the first user reviews the received invitations and selects one. In step 104, the user who sent the invitation that was accepted by the first user (the "selected user") is notified that his/her invitation has been selected. In step 106, a date request is created for each user who sent a non-selected invitation (a "rejected user") using the calendar date and/or time and location from the first user's date request and is added to the pool. In this manner, the pool is maintained with a large number of date requests at any given time and rejected users are provided with additional opportunities to set up dates with other users.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the necessary data.

Note that in certain example implementations, the matching functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving by a computer-implemented matching system a first date request from a first user, wherein the first date request includes a calendar date and a location;
   placing the first date request into a pool of date requests;
   receiving a request from a second user to browse the pool of date requests, wherein each of the date requests in the pool is associated with one and only one user comprising a potential match for the second user in the computer-implemented matching system and includes a calendar date and a location;
   determining whether the first user is a quality match for the second user;
   presenting to the second user the first date request and information associated with the first user if the first user is determined to be a quality match for the second user;
   subsequent to selection by the second user of the first date request, presenting to the first user an invitation corresponding to the first date request and an opportunity to accept or decline the date request; and
   presenting the second user with notification of the first user's acceptance or declination of the invitation;
   creating a new date request for the second user, wherein the new date request is identical to the first date request if the first user declines the invitation; and
   adding the new date request to the date request pool;
   wherein the information associated with the first user comprises a photograph of the first user; and
   wherein the photograph of the first user is partially obfuscated using a puzzlization technique, thereby providing the second user with an unclear picture of the first user's appearance.

2. The method of claim 1, wherein the request further comprises filtering criteria, and wherein the presenting further comprises:
   identifying at least one of the date requests that meets the filtering criteria; and
   presenting to the second user information regarding the first user associated with the identified at least one of the date requests.

3. The method of claim 1, wherein the information associated with the first user comprises at least one of a name, an age, and a sexual orientation of the first user.

4. The method of claim 1, wherein the invitation includes information identifying the second user.

5. The method of claim 1, wherein the invitation includes at least one of a name, age, sexual orientation, and photograph of the second user.

6. The method of claim 5, wherein the photograph is partially obfuscated using a puzzlization technique, thereby providing an unclear picture of the second user's appearance.

7. One or more non-transitory tangible media that includes code for execution and when executed by a processor is operable to perform operations comprising:
   receiving by a computer-implemented matching system a first date request from a first user, wherein the first date request includes a calendar date and a location;
   placing the first date request into a pool of date requests;
   receiving a request from a second user to browse the pool of date requests, wherein each of the date requests in the pool is associated with one and only one user comprising a potential match for the second user in the computer-implemented matching system and includes a calendar date and a location;

determining whether the first user is a quality match for the second user;

presenting to the second user the first date request and information associated with the first user if the first user is determined to be a quality match for the second user;

subsequent to selection by the second user of the first date request, presenting the first user an invitation corresponding to the first date request and an opportunity to accept or decline the date request; and presenting the second user with notification of the first user's acceptance or declination of the invitations;

creating a new date request for the second user, wherein the new date request is identical to the first date request if the first user declines the invitation; and adding the new date request to the date request pool;

wherein the information associated with the first user comprises a photograph of the first user; and wherein the photograph of the first user is partially obfuscated using a puzzlization technique, thereby providing the second user with an unclear picture of the first user's appearance.

8. The media of claim 7, wherein the request further comprises filtering criteria and wherein the presenting further comprises:

identifying at least one of the date requests that meets the filtering criteria; and presenting to the second user information regarding the first user associated with the identified at least one of the date requests.

9. The media of claim 7, wherein the information associated with the first user comprises at least one of a name, an age, and a sexual orientation of the first user.

10. The media of claim 7, wherein the invitation includes information identifying the second user.

11. The media of claim 1, wherein the invitation includes at least one of a name, age, sexual orientation, and photograph of the second user.

12. The media of claim 11, wherein the photograph is partially obfuscated, thereby providing an unclear picture of the second user's appearance.

13. A server, comprising:

a processor and a memory, wherein the server is configured to:

receive by a computer-implemented matching system a first date request from a first user, wherein the first date request includes a calendar date and a location;

place the first date request into a pool of date requests;

receive a request from a second user to browse the pool of date requests, wherein each of the date requests in the pool is associated with one and only one user comprising a potential match for the second user in the computer-implemented matching system and includes a calendar date and a location;

determine whether the first user is a quality match for the second user;

present to the second user the first date request and information associated with the first user if the first user is determined to be a quality match for the second user;

subsequent to selection by the second user of the first date request, present the first user an invitation corresponding to the first date request and an opportunity to accept or decline the date request;

present the second user with notification of the first user's acceptance or declination of the invitation;

create a new date request for the second user, wherein the new date request is identical to the first date request if the first user declines the invitation; and add the new date request to the date request pool;

wherein the information associated with the first user comprises a photograph of the first user; and wherein the photograph of the first user is partially obfuscated using a puzzlization technique, thereby providing the second user with an unclear picture of the first user's appearance.

14. The server of claim 13, wherein the request further comprises filtering criteria and wherein the server is further configured to:

identify at least one of the date requests that meets the filtering criteria; and present to the second user information regarding the first user associated with the identified at least one of the date requests.

15. The server of claim 13, wherein the information associated with the first user comprises at least one of a name, an age, and a sexual orientation of the first user.

* * * * *